United States Patent
Chandu et al.

(10) Patent No.: US 8,322,811 B2
(45) Date of Patent: Dec. 4, 2012

(54) MULTI-PASS CALIBRATION IN FIXED PRINTHEAD ARRAY PRINTERS

(75) Inventors: Kartheek Chandu, Longmont, CO (US); Mikel J. Stanich, Longmont, CO (US); Larry M. Ernst, Longmont, CO (US)

(73) Assignee: Ricoh Production Print Solutions LLC, Boulder, CO (US)

( * ) Notice: Subject to any disclaimer, the term of this patent is extended or adjusted under 35 U.S.C. 154(b) by 410 days.

(21) Appl. No.: 12/640,692

(22) Filed: Dec. 17, 2009

(65) Prior Publication Data
US 2011/0148968 A1    Jun. 23, 2011

(51) Int. Cl.
*B41J 2/205*    (2006.01)

(52) U.S. Cl. ............... 347/15; 347/13; 347/19; 347/41; 347/42

(58) Field of Classification Search .................. None
See application file for complete search history.

(56) References Cited

U.S. PATENT DOCUMENTS

| | | | |
|---|---|---|---|
| 5,347,369 A | 9/1994 | Harrington | |
| 6,775,029 B1 | 8/2004 | Wen et al. | |
| 7,513,589 B2 | 4/2009 | Eldar et al. | |
| 7,576,893 B2 | 8/2009 | Hains et al. | |
| 2005/0174374 A1* | 8/2005 | Ebihara et al. | 347/13 |
| 2007/0139733 A1 | 6/2007 | Mizes et al. | |
| 2009/0201325 A1 | 8/2009 | Ready et al. | |

* cited by examiner

*Primary Examiner* — Uyen Chau N Le
*Assistant Examiner* — Chad Smith
(74) *Attorney, Agent, or Firm* — Duft Bornsen & Fishman, LLP

(57) ABSTRACT

Methods and apparatus herein provide for automated calibration of multiple printheads used in a multi-pass printing system. Aspects hereof print a plurality of gray scale printed patterns each printed pattern corresponding to a gray scale value for each of the multiple printheads. The printed patterns are then measured to determine the intensity (e.g., optical density) of each of the printed patterns. A measurement function is derived from the measured intensity and gray scale levels used to print each pattern. Calibrated transfer functions are then determined from the measurement function and target function where each calibrated transfer function relates, for a corresponding printhead, an input gray scale level of a pixel in an image to be printed to a calibrated gray scale level to use for the corresponding printhead when operating in multi-pass mode.

20 Claims, 14 Drawing Sheets

Resultant transfer function for the same TRC criteria

Resultant transfer functions for low ink usage criteria

US 8,322,811 B2

MULTI-PASS CALIBRATION IN FIXED PRINTHEAD ARRAY PRINTERS

BACKGROUND

1. Field of the Invention

The invention relates to the field of printing systems, and in particular, to methods and systems for calibration of multiple fixed printheads in a printing system.

2. Statement of the Problem

In high speed production printing system using inkjet technologies it is common to utilize multiple printheads for various reasons. In some cases multiple printheads provide improved speed and/or improved print quality Inkjet printheads, electrophotographic toner printheads, wax printheads, etc. all have some inherent technological limits for the volume of colorant dispersed over time. Thus multiple printheads may be employed to generate a given image print quality more quickly. Or, multiple printheads may be employed to apply a larger volume of colorant over a given period of time to improve print quality (i.e., image optical density).

To meet the demand for producing the high quality images, printers are designed with a number of printheads in a fixed array arrangement, where only the media moves. This is very commonly used in high speed production inkjet printers. However, due to the technology limitations, design of faster firing printheads is difficult to accomplish. An alternate way of producing higher color image quality is to increase the number of printheads and print the same image multiple times on the media at same location. This mode of printing is usually referred as "multiple pass" printing (or simply "multi-pass"). Normal printing using a single printhead is referred to as "single pass" printing. For example, adding twice the number of printheads will enable printing the same image twice at double the speed of single pass, producing the same print quality as single pass printing.

One such dual-pass printing design uses two channels to print the same data twice on fast moving media. These two passes use different screens/halftones to print. This design also allows for controllably switching between single pass printing mode and dual-pass printing mode. The screens/halftones for single pass printing are usually calibrated to produce distinct 256 output "gray" levels on the media. However, when the two single passes print the same image twice with those calibrated screens/halftones the resulting output will not produce the desired distinct 256 gray scale levels. The shadow tone region gray scale levels may be saturated with ink (e.g., colorant) due to high dot gain. At the point in the tone range where saturation occurs, the solid area density ceases to increase. Some calibration mechanism is required to produce 256 distinct gray scale levels when printing using dual-pass.

As presently practiced, a variety or multiple pass printer calibration procedures are known. Most of the presently known calibration techniques are restricted to scanning/moving print heads. Other presently known calibration techniques discuss procedures to split and distribute the dots in screens between each passes.

None of the presently known calibrating techniques adequately address two independent fixed printheads, each of which print the entire page image, so as to assure appropriate optical density at each of the possible gray scale levels for a pixel's intensity. Thus it is an ongoing challenge to properly calibrate multiple fixed printheads operating in a dual-pass (i.e., multi-pass) mode.

SUMMARY

Embodiments of the invention solve the above and other related problems with methods and apparatus for calibrating multiple fixed array printheads used in a multi-pass printing system. As used herein, "ink" refers to the colorant material used regardless of the printing technology applied (e.g., inkjet, electrophotographic, wax, etc.).

One embodiment provides a method and another embodiment provides a computer readable medium embodying the method. The method is for calibrating multiple fixed printheads operable in a multi-pass printing system to print a provided image on the printing system, the image comprising a plurality of pixels, each pixel associated with an input gray scale level. The method includes printing a plurality of printed patterns. Each printed pattern is generated as a combination of each of the multiple fixed printheads (1 . . . j) operating in a multi-pass mode. Each of the multiple fixed printheads generates a gray scale pattern associated with a corresponding gray scale level for each of the plurality of printed patterns. Each of the printheads uses substantially the same ink. The method also includes measuring the intensity of each of the plurality printed patterns. The method then determines a combined measurement function for the multiple fixed printheads operating in a multi-pass mode. The combined measurement function relates the measured intensities to the corresponding gray scale level of each printed pattern generated by each of the multiple printheads. The method also determines a calibrated transfer function for each of the multiple fixed printheads based on the combined measurement function. Each calibrated transfer function relates an input gray scale level of the image to a corresponding gray scale level used by a corresponding fixed printhead operating in multi-pass mode. The method then translates the input gray scale level of each pixel into a calibrated gray scale level for each of the multiple fixed printheads using the calibrated transfer function for each printhead. Lastly, the method prints the image on the printing system operating in the multi-pass mode using the calibrated gray scale level for each pixel of the image printed by each printhead.

Another embodiment of the invention provides a printing system adapted for multi-pass mode of operation using multiple printheads. The system includes multiple fixed printheads configured to sequentially apply ink to a printable substrate passing by the printheads and an intensity measurement device configured to measure the intensity of printed patterns generated by the multiple fixed printheads. Each of the printheads uses substantially the same ink. The system also includes a multi-pass calibration controller coupled with the multiple fixed printheads and coupled with the intensity measurement device. The multi-pass calibration controller is adapted to print a plurality of printed patterns. Each printed pattern is generated as a combination of each of the multiple fixed printheads (1 . . . j) operating in a multi-pass mode. Each of the multiple fixed printheads generates a gray scale pattern associated with a corresponding gray scale level for each of the plurality of printed patterns. The calibration controller is further adapted to measure the intensity of each of the plurality printed patterns and further adapted to determine a combined measurement function for the multiple fixed printheads operating in a multi-pass mode. The combined measurement function relates the measured intensities to the corresponding gray scale level of each printed pattern generated by each of the multiple printheads. The calibration controller is further adapted to determine a calibrated transfer function for each of the multiple fixed printheads based on the combined measurement function. Each calibrated transfer function relates an input gray scale level of the image to a corresponding gray scale level used by a corresponding fixed printhead operating in multi-pass mode. The printing system is adapted to translate an input gray scale level of each pixel of a provided image into a calibrated gray scale level for each of the multiple fixed printheads using the calibrated transfer function for each printhead. The printing system is further adapted to print the provided image on the printing system operating in the multi-pass mode using the calibrated gray scale level for each pixel of the image printed by each printhead.

The invention may include other exemplary embodiments described below.

BRIEF DESCRIPTION OF THE DRAWINGS

The same reference number represents the same element or the same type of element on all drawings.

DETAILED DESCRIPTION OF THE DRAWINGS

FIGS. 1-15 and the following description depict specific exemplary embodiments of the present invention to teach those skilled in the art how to make and use the invention. For the purpose of this teaching, some conventional aspects of the invention have been simplified or omitted. Those skilled in the art will appreciate variations from these embodiments that fall within the scope of the present invention. Those skilled in the art will appreciate that the features described below can be combined in various ways to form multiple variations of the present invention. As a result, the invention is not limited to the specific embodiments described below, but only by the claims and their equivalents.

Figure 1:
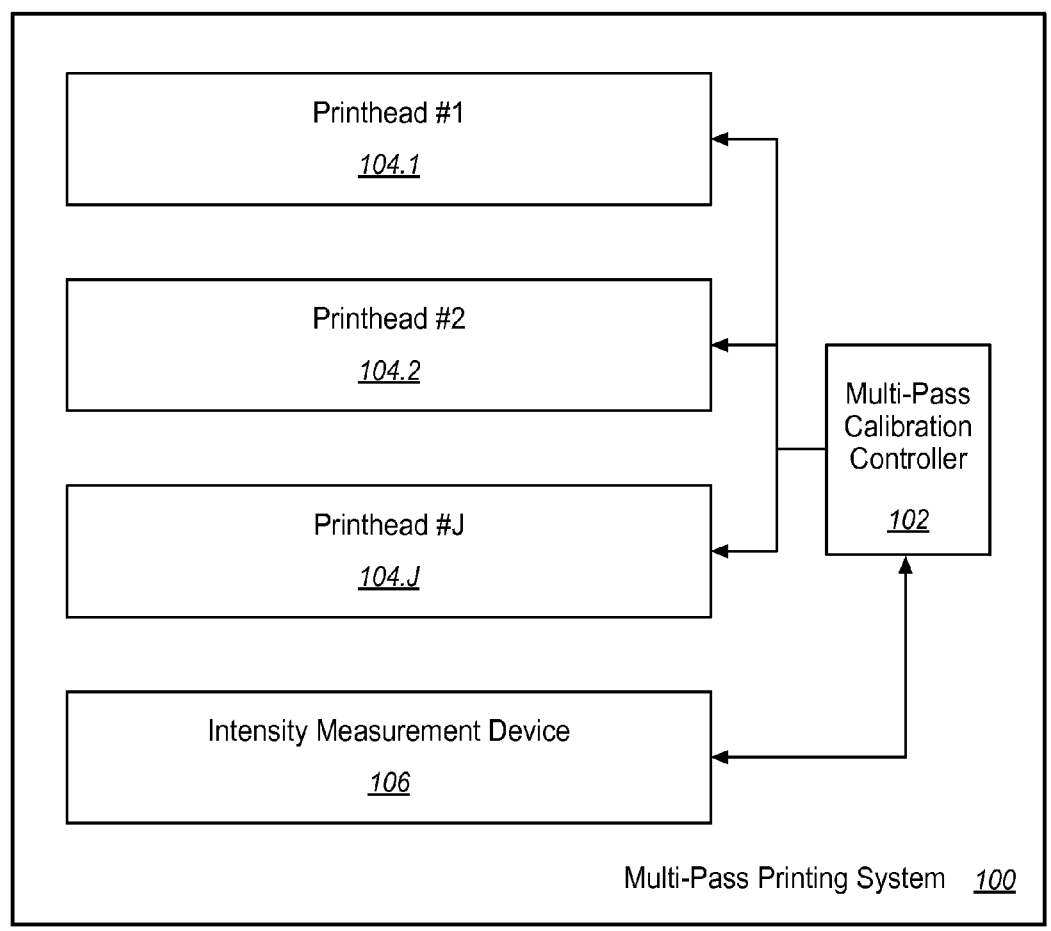
FIG. 1 is a block diagram of an exemplary multi-pass printing system embodying multi-pass calibration features in accordance with an embodiment of the invention.

FIG. 1 is a block diagram of a printing system 100 that includes multi-pass printing capabilities using a plurality of printheads. Printing system 100 includes multiple printheads 104.1, 104.2 through 104.j. Each of the printheads comprises an array of printing elements generally spanning the width of a printable substrate media (e.g., paper) passing by each of the multiple printheads. In an exemplary embodiment each element of the array is an inkjet element operable to mark a printable substrate with liquid ink. In accordance with features and aspects hereof, each of the multiple printheads utilizes substantially the same ink. Inks (e.g., colorants including electrophotographic toners and wax colorants) are "substantially the same" if they are the same chemical formulation and/or if they present the same physical and optical characteristics. In the case where the printing technology is inkjet, typically each printhead uses an identical liquid ink supply—e.g., identical ink cartridges or even a common liquid ink reservoir. Features and aspects hereof may be similarly applicable to electrophotographic (e.g., laser) printing systems. Thus, as used herein, "ink" may refer to liquid inks in inkjet technology, may refer to toners as used in electrophotographic printing technologies, and/or any other colorants used in multiple fixed array printhead multi-pass printing systems. As discussed above, in the multi-pass printing mode of printing system 100, each of the multiple printheads 104.1 through 104.j marks a printable substrate (e.g., paper—not shown) with gray scale patterns representing an image to be printed on the substrate. Where multiple heads mark the substrate, signals applied to each head must be calibrated so that the combination of markings produced by the plurality of printheads 104.1 through 104.j generate the desired final output. To perform such calibration, a multi-pass calibration controller 102 in printing system 100 is coupled with each of the plurality of printheads 104.1 through 104.j and is coupled with an intensity measuring device 106. An appropriate test pattern is generated in the multi-pass printing mode by multi-pass calibration controller 102 generating appropriate image data applied to each of the multiple printheads 104.1 through 104.j. After the combination of printed patterns is marked on the printable substrate, intensity measurement device 106 measures the intensity (or other optical characteristics) of the printed test patterns and returns the measurement data to multi-pass calibration controller 102. The multi-pass calibration controller 102 receives the measured intensity information and determines a calibrated transfer function for each of the multiple fixed printheads for translating each input gray scale level of an image to be printed into a corresponding gray scale level to be used by the corresponding printhead when operating the printing system 100 in the multi-pass printing mode.

Figure 2:
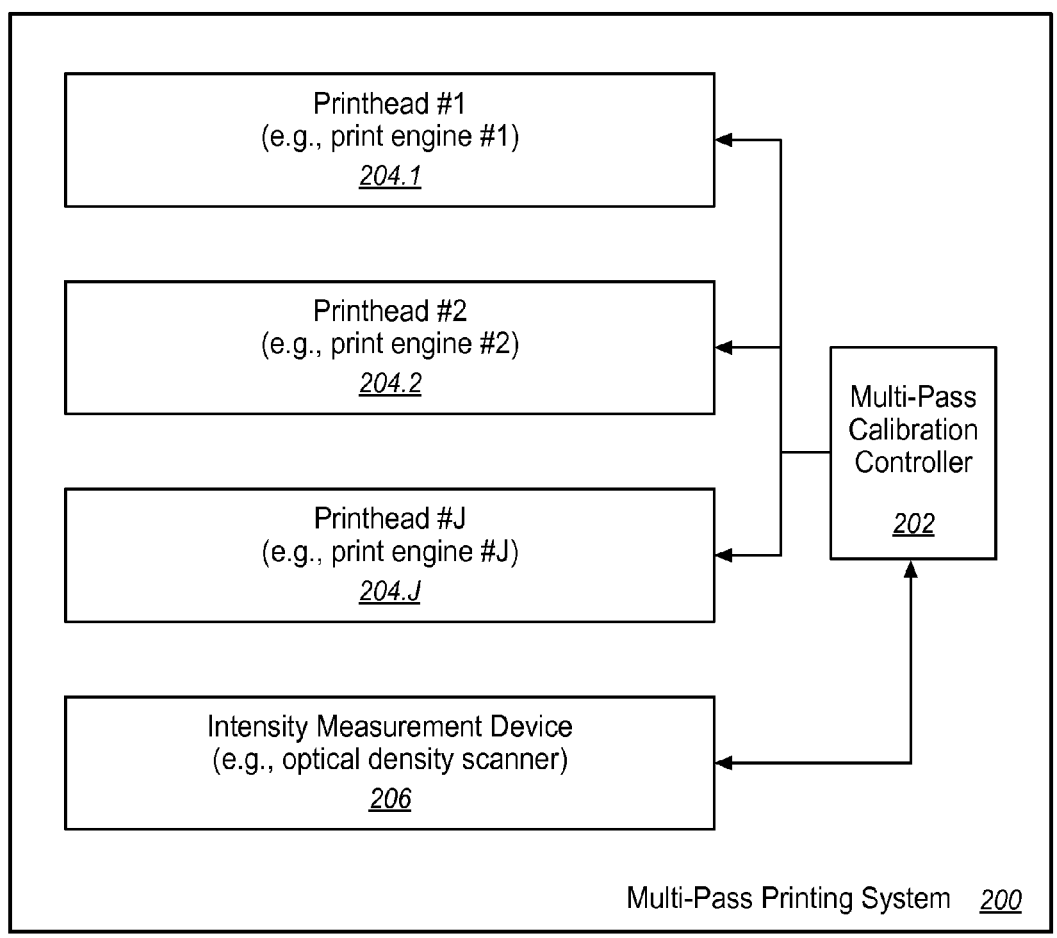
FIG. 2 is a block diagram of another exemplary multi-pass printing system embodying multi-pass calibration features using multiple print engines in accordance with an embodiment of the invention.

FIG. 2 is a block diagram showing a multi-pass printing system 200 in one exemplary embodiment where each printhead 204.1 through 204.j is associated with a corresponding distinct print engine such that the printable substrate (e.g., paper) moves sequentially from each print engine to a next print engine, each engine marking the substrate with the image to be imprinted. Multi-pass printing system 200 also includes intensity measuring device such as an optical density scanning device to scan the printed patterns generated by multi-pass calibration controller 202. The optical scan intensity measurement (optical density) from measurement device 206 is returned to multi-pass calibration controller 202 to thereby determine calibrated transfer functions for each of the multiple printheads/engines.

It will be readily understood by those of ordinary skill in the art that the apparatus and systems shown in FIGS. 1 and 2 may represent a multi-pass printing system and calibration controller for a single color plane of a full color printing system. Thus, the apparatus and systems shown in FIGS. 1 and 2 may be replicated for each of the multiple color planes in a full color printing system. For example, there may be multiple printheads/engines for each of four color planes in a CMYK architected full color printing system—i.e., multiple printheads for the Cyan color plane, multiple printheads for the Magenta color plane, multiple printheads for the Yellow color plane, and multiple printheads for the Black color plane. A multi-pass calibration controller may be replicated to perform the calibration processing for each of the multiple color planes or the multi-pass calibration controller logic and intensity measurement device may be shared to provide the desired calibration for each of the multiple color plane printheads/engines. Further, as noted above, each of the multiple printheads for any one of the multiple colors of a full color printing system uses substantially the same ink. For example, each of the multiple printheads for the Cyan color uses substantially the same Cyan ink and so on for each of the multiple color planes.

Those of ordinary skill in the art will readily recognize numerous additional and equivalent elements in a fully operational printing system such as system 100 and 200 of FIGS. 1 and 2, respectively. Such additional and equivalent elements or omitted herein for simplicity and brevity of this discussion. Further, those of ordinary skill in the art will recognize a wide variety of intensity measurement devices in addition to the optical scanning capability discussed above with respect to FIG. 2. In particular, other forms of optical measurement may include densitometers, spectrophotometers, etc.

Figure 3:
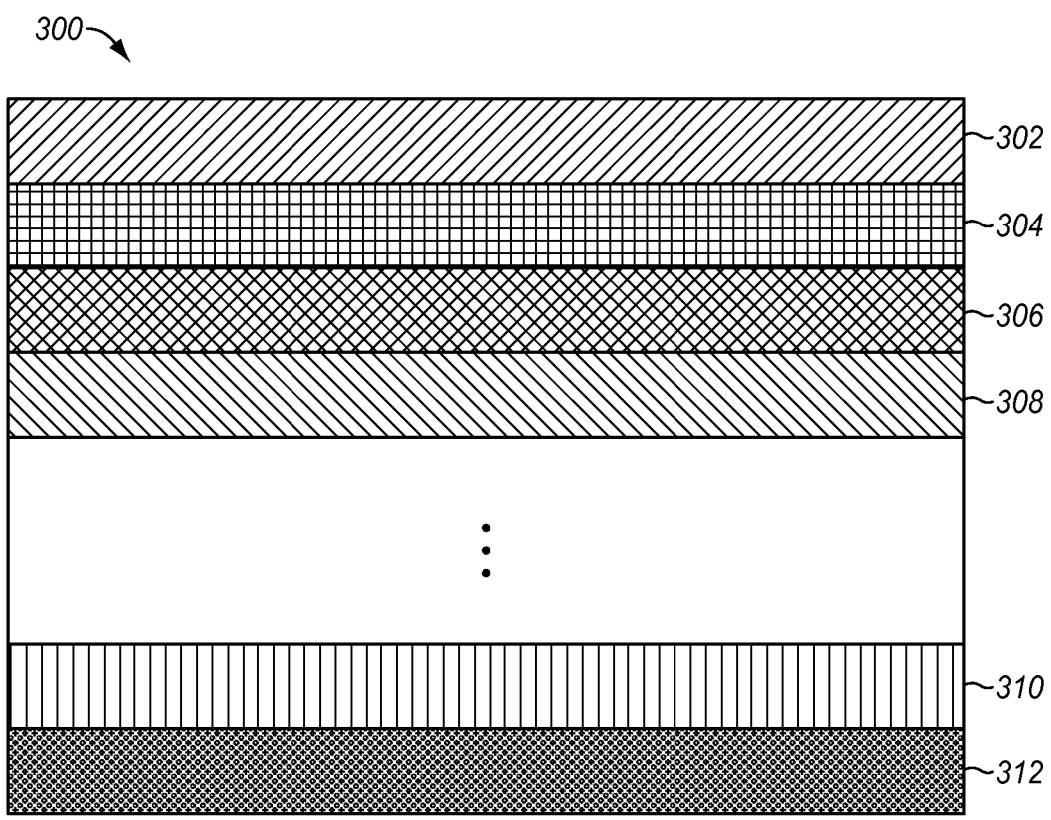
FIG. 3 is a diagram of an exemplary calibration test pattern comprising a plurality of printed patterns used to calibrate the multi-pass operation of the multiple printheads of the multi-pass printing system in accordance with an embodiment of the invention.

As noted above, the multi-pass calibration controller of FIGS. 1 and 2 generates a test pattern comprising a plurality of gray scale printed patterns ranging from a minimum gray scale pattern through a maximum gray scale pattern. Each gray scale pattern generated corresponds to a gray scale level associated with an input image for that printhead/engine to specify the input gray scale level of each pixel of the image. FIG. 3 represents an exemplary test image 300 generated by the multi-pass calibration controller applying gray scale level values to each of the multiple printheads. The test image is for purposes of measuring the intensity produced by the combination of printheads operating in the multi-pass printing mode. The multi-pass calibration controller applies a gray scale level to each of the printheads for printing each of a plurality of gray scale printed patterns 302 through 312. For example, where a gray scale level is identified by an eight bit value ranging from 0 through 255, each printhead will receive a gray scale level value in that range to print each of the gray scale printed patterns 302 through 312. In one exemplary embodiment, using the same gray level for each printhead, each of the possible 256 gray scale values may be generated as printed patterns 302 through 312. In other exemplary embodiments, again using the same gray level for each printhead, a subset of the range of values may be applied to generate a subset of the possible gray scale printed patterns. Alternatively, different gray scale level values may be applied to each of the printheads for printing any one of the printed patterns. The test image 300, comprising printed patterns 302 through 312, may then be measured to determine the intensity of each of the printed patterns. In one exemplary embodiment, an optical scanner may be used within the printing system to measure the intensity of each of the printed patterns 302 through 312. Such an optical scanner measures the intensity as Red, Green and Blue (RGB). These RGB values can be converted into optical density. The remainder of this discussion may express the measured intensity primarily in terms of optical density. However, those of ordinary skill in the art will readily recognize numerous other optical properties/characteristics that may be measured by suitable measurement devices to determine the intensity of each of the printed patterns.

Figure 4:
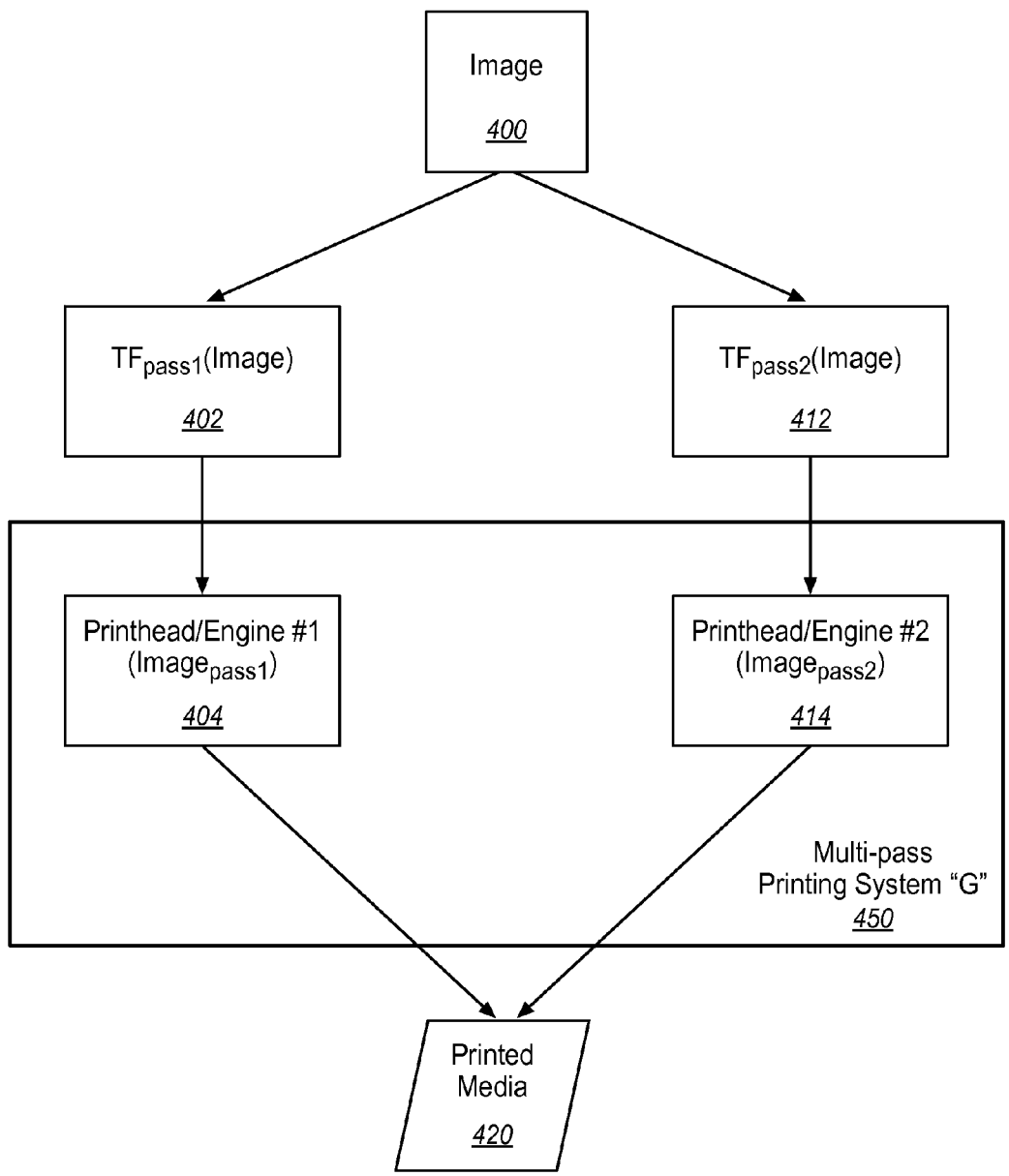
FIG. 4 is an exemplary data flow diagram describing the flow of an image to be printed in a multi-pass printing system calibrated in accordance with an embodiment of the invention.

Based on the measured intensity of the combined output of the multiple printheads (i.e., a combined measurement function or, in the case of two printheads, a dual-pass measurement function), a calibrated transfer function may be determined for each of the multiple printheads to permit translation of an input gray scale associated with pixel of an image to be printed into a corresponding calibrated gray scale level to achieve a desired target intensity for marking of each pixel of an output image by the printing system operating in multi-pass mode. FIG. 4 is a block diagram suggesting the flow of information through such a multi-pass printing system (G.). A contone image 400 to be printed by the printing system is provided by a suitable source (e.g., an attached host system or print server). Each pixel to be printed from the provided image is transformed by the respective transfer function for each of the multiple printheads. A first transfer function 402 ($TF_{pass1}$(Image)) translates/transforms the input gray scale level of each pixel of the provided image 400 into calibrated gray scale levels applied to the first printhead/engine 404 to thereby produce markings corresponding to $Image_{pass1}$. A second transfer function 412 ($TF_{pass2}$(Image)) translates/transforms input gray scale levels of pixels of the provided image 400 into calibrated gray scale levels applied to the second printhead or print engine 414 to thereby produce markings corresponding to $Image_{pass2}$. The markings generated by print engine printhead/engine 404 and those produced by printhead/engine 414 are then applied to the printed media 420 to generate the printed image based on the calibrated transfer functions to produce the desired printed output in multi-pass mode.

The output of printheads 404 and 414 need not be based on identical transfer functions. In other words, the transfer functions may be selected from a set of possible transfer functions based on additional criteria so as to improve aspects of the printing system operation while still generating the desired quality image. These additional criteria may be used to adjust the volume of ink dispersed by printheads relative to one another. For example, the additional criteria may include: reduction of ink usage by one or more of the printheads relative to other printheads, reduction of paper wetness from the printed output image, reduction of graininess of the output image, and/or improved uniformity of the printed output. Still other additional criteria will be evident to those of ordinary skill in the art to improve operation of the multi-pass printing system.

The printing system operable in multi-pass mode may be understood with respect to an algorithm operable in the multi-pass calibration controller of FIG. 1 or 2 as follows. For purposes of this discussion the multi-pass printing system will be presumed to incorporate two printheads/engines—hence a "dual-pass" printing system. Though the algorithm is discussed in terms of such a dual-pass system, it is easily extended to multi-pass operation with any number of printheads. Further, though the algorithm described below is expressed in terms of optical density (OD) as the measured intensity, any suitable measured of intensity (IN) may be used.

Assume the OD measured value $OD_{measured\_mpass}$ at gray scale levels $(r_1, r_2)$ for the dual-pass system H:

$$OD_{measured\_mpass} = H(r_1, r_2) \Rightarrow (r_1, r_2) = H^{-1}(OD_{measured\_mpass})$$

where $H^{-1}$ is the inverse of the function H.

Figure 5:
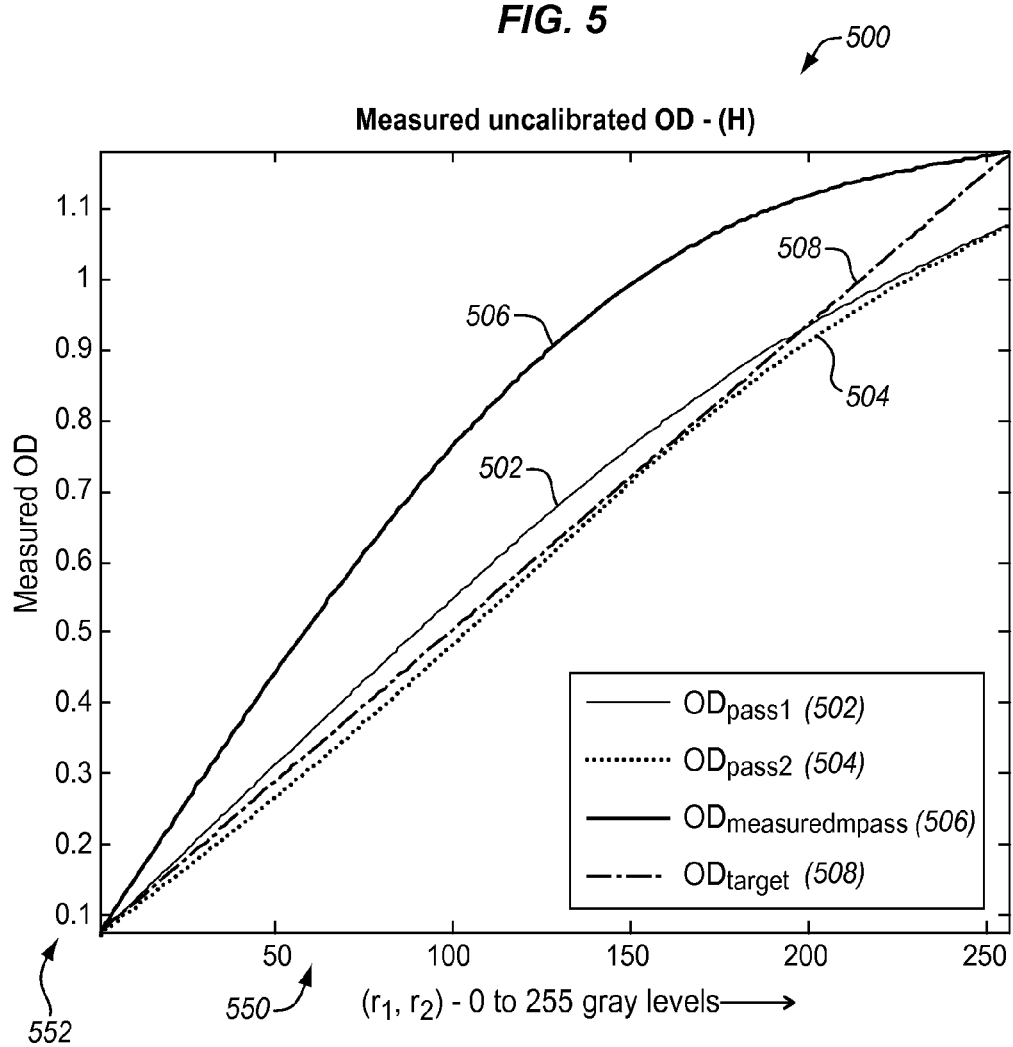
FIG. 5 shows a 2-dimensional graph of measurements of an un-calibrated multi-pass printing system using each of the printheads in a single pass mode and the combination of printheads in a multi-pass mode.
Figure 6:
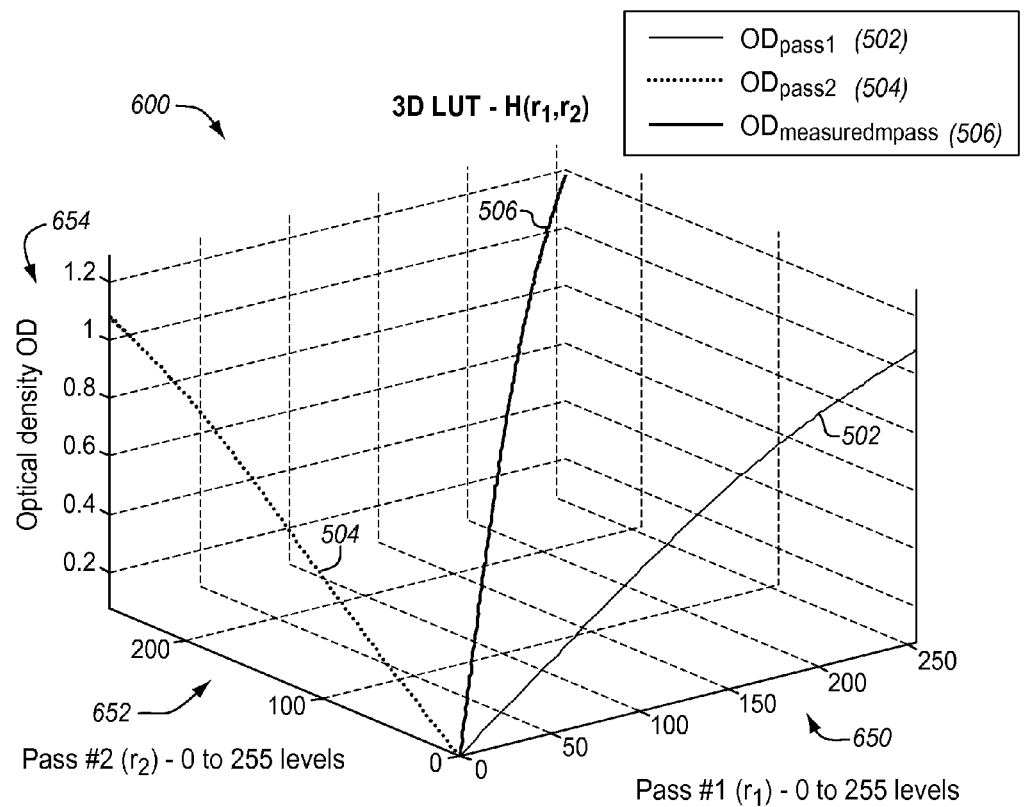
FIG. 6 shows a 3-dimensional graph showing the data of FIG. 5 plotted in a 3-dimensional graph.

FIG. 5 is a graph 500 showing the relationship of the OD for each printhead if used in a single pass mode ($OD_{pass1}$ 502 and $OD_{pass2}$ 504), the $OD_{measured\_mpass}$ (506—i.e., the measured intensity) for the combination of printheads operating in multi-pass mode, and the desired optical density ($OD_{target}$ 508—i.e., a desired target intensity) over a range of gray scale level values for each printhead ($r_1$ and $r_2$—$r_1$ and $r_2$ ranging between 0 and 255). The X-axis 550 indicates the gray scale level values for $r_1$ and $r_2$ and the Y-axis 552 indicates the OD (intensity). It can be seen in FIG. 5 that the nominal output of each printhead ($OD_{pass1}$ 502 and $OD_{pass2}$ 504) operated in a single pass mode would, if combined in a multi-pass mode of printing, produce a measured intensity ($OD_{measured\_mpass}$ 506) that exceed the desired target intensity ($OD_{target}$ 508). The nominal intensity output of each printhead when operated in a single-pass mode may be specified by a manufacturer of the printhead/engine or may be measured by well known test procedures. FIG. 5 plots this relationship as a simple 2-dimensional diagram where, for any pair (e.g., "2-tuple" or more generally simply "tuple") of identical gray scale levels ($r_1$, $r_2$ where $r_1 = r_2$), the measured OD may be determined.

Where different combinations of gray scale levels ($r_1$, $r_2$) are used, the function H defines a three dimensional surface. FIG. 6 is a graph 600 showing the values of FIG. 5 plotted on a 3-dimensional plot where the X-axis 650 is the gray scale level ($r_1$) applied to the first printhead, the Y-axis 652 is the gray scale level ($r_2$) applied to the second printhead, and the Z-axis 654 indicates the measured intensity (OD) of the combined outputs of the two printheads operated in the dual-pass mode and the measured intensity (OD) of each printhead operated in a single-pass mode. Curves 502 and 504 represent the single-pass OD of each printhead and curve 506 represents the combined measured OD of the dual-pass operation of the printheads, respectively (as depicted in 2 dimensions in FIG. 5).

Figure 7:
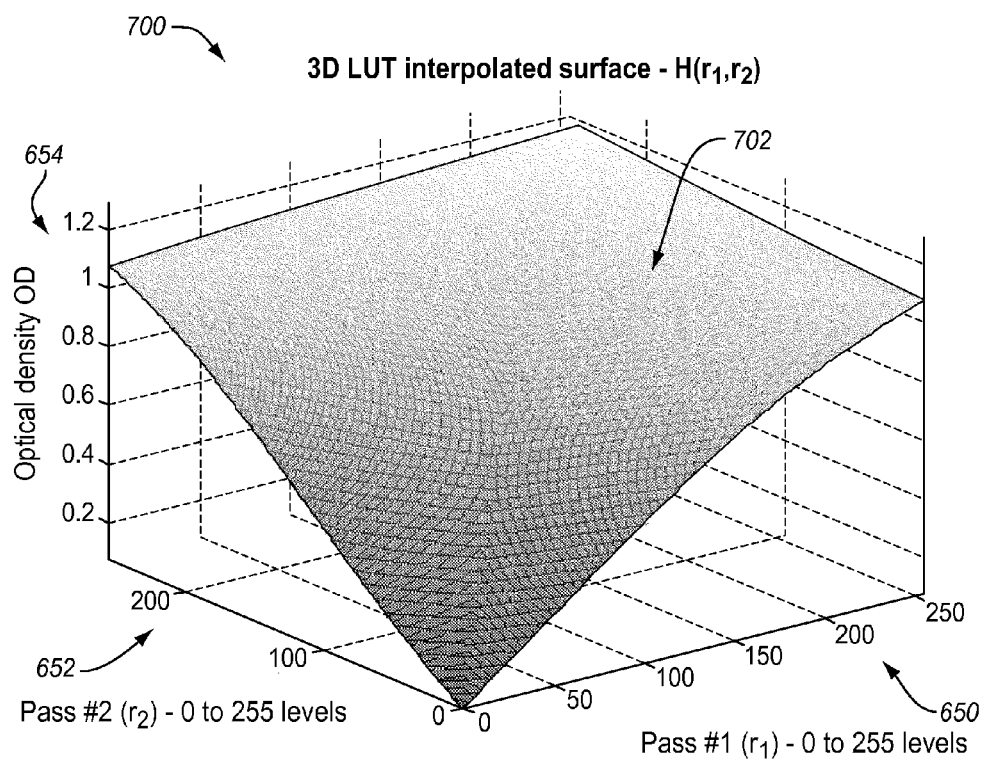
FIG. 7 shows a 3-dimensional graph of the data of FIG. 6 with other points of the surface interpolated and/or measured.

Since $r_1$ and $r_2$ are independent and need not be identical there is a possibility of multiple combinations of $r_1$ and $r_2$ that may produce a particular desired target intensity. FIG. 7 is a graph 700 similar to graph 600 of FIG. 6 showing all interpolated points of the 3-dimensional surface 702. The color-coding (shading/hatching) of surface 702 indicates bands of constant measured OD that can be achieved by different combinations of $r_1$ and $r_2$ gray scale values applied to each of the dual printheads.

The algorithm of the multi-pass calibration controller assumes the intensity target value $OD_{target}$ at gray scale level $r_{target}$ for the desired dual-pass system G. Hence:

$$OD_{target} = G(r_{target}) \Rightarrow r_{target} = G^{-1}(OD_{target})$$

Where G is a function that defines the target output of the dual-pass printing system for a given gray scale level value $r_{target}$ and $G^{-1}$ is the inverse of that function. Equating the target and measured OD allows us to determine the values where the measured system has the same intensity (e.g., optical density) as the target system. Thus:

$$OD_{measured\_mpass} = OD_{target}$$

$$\Rightarrow H(r_1, r_2) = G(r_{target})$$

To establish the set of calibrated transfer functions, which are required to achieve a calibrated dual-pass system, the algorithm equates the OD values and solves for the gray scale levels. For each gray scale level $r_{target}$ in the target system, the previous equation indicates the OD which is desired. Next, gray scale levels ($r_1$, $r_2$) can be determined in the dual-pass system which would be required to be printed by each of the printheads/engines of the dual-pass system to achieve to $OD_{target}$ value.

$$H(r_1, r_2) = G(r_{target})$$

$$\Rightarrow (r_1, r_2) = H^{-1}(G(r_{target}))$$

The above equation may be generalized for any number of printheads/engines as:

$$(r_1, r_2, r_3 \ldots r_j) = H^{-1}(G(r_{target}))$$

where $r_1, r_2, r_3 \ldots r_j$ are gray scale level inputs to be applied to corresponding printheads to generate the output intensity (e.g., an "n-tuple" or more specifically as above a "j-tuple" or more generally simply a "tuple").

The inverse result ($H^{-1}$) is not a single valued function because the function H defines a surface. All of the possible solutions for a given desired target intensity value ($OD_{target}$) in a dual-pass printing system can be visualized as the intersection of the function H and a plane representing the constant intensity value ($OD_{target}$). For each constant intensity value (e.g., optical density) there is associated with it an $r_{target}$ value. The intersection of the surface H with the constant intensity value plane projected into the plane formed by the $r_1, r_2$ axes indicate all of the possible solutions. More generally, the function H defines a surface of dimension j+1 where j is the number of printheads in the multi-pass printing system. A constant intensity surface, having a value equal to $OD_{target}$, intersecting the surface defined by the function H defines all possible combinations of gray scale values that may be applied to the j printheads to achieve a desired target intensity ($OD_{target}$).

For each $r_{target}$ value the algorithm can compute specific $r_{calib1}$ and $r_{calib2}$ values, which must be printed by the measured system H to achieve the target output system G and which also satisfies our additional criteria. This can be done for all integer gray scale levels (e.g., 0, 1 . . . 255 for an 8 bit system or generally from a minimum up through a maximum gray scale level value).

Figure 8:
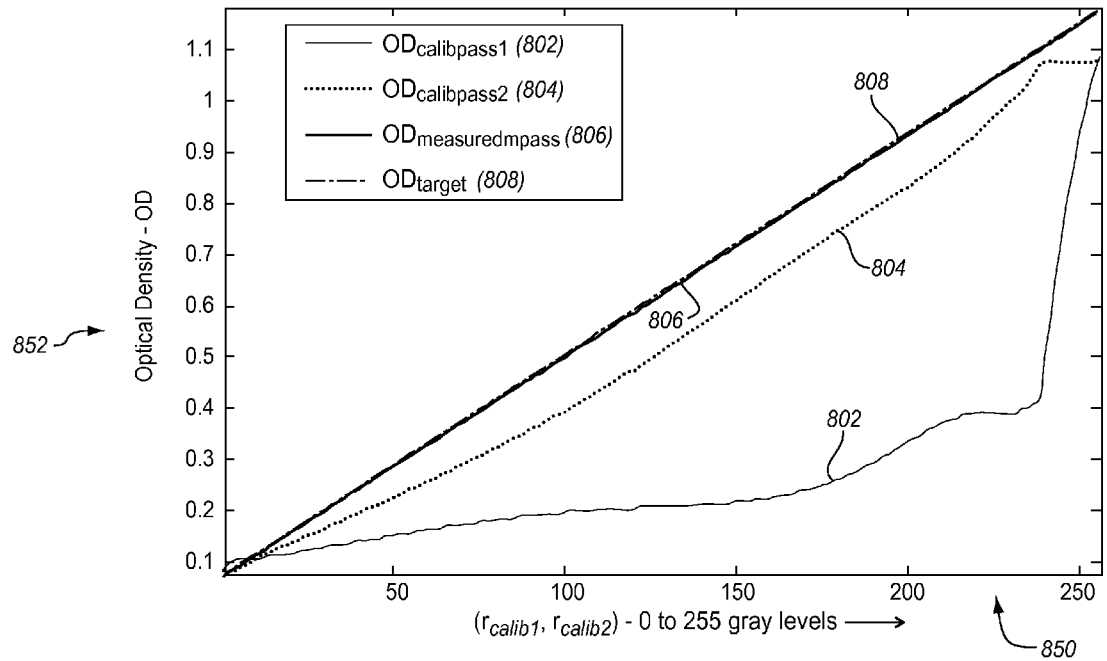
FIGS. 8 and 9 show graphs of exemplary solutions for generating desired target intensity for a range of gray scale level values when operating the printing system in a multi-pass mode calibrated in accordance with an embodiment of the invention.
Figure 9:
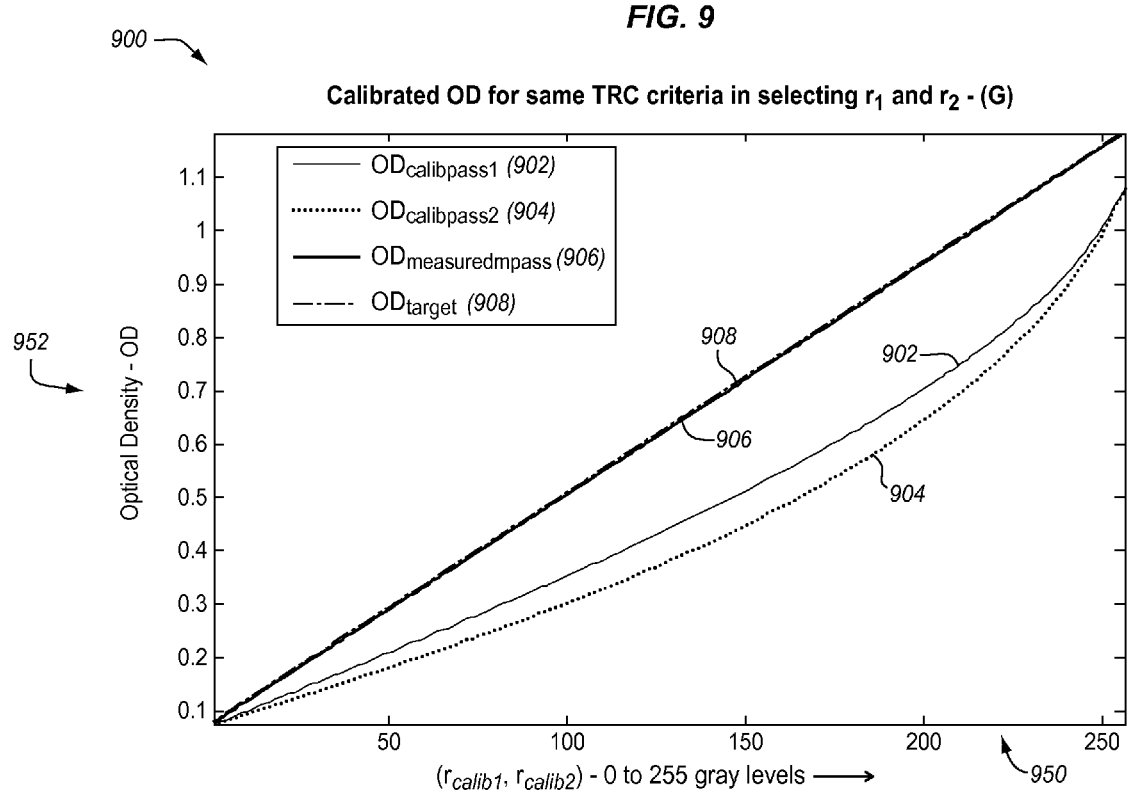

The graphs of FIGS. 8 and 9 illustrate different combinations of ($r_{calib1}$, $r_{calib2}$) representing solutions based on different additional criteria but which achieve the same target intensity $OD_{target}$. FIG. 8 is a graph 800 showing measured intensity output of a dual-pass printing system using calibrated gray scale levels for each of two printheads. The particular transform functions used in this example are selected to produce the desired target intensity while reducing ink usage of one of the printheads. The X-axis 850 indicates a range of gray scale level values (e.g., ranging from 0 through 255 for an 8-bit gray scale printing system embodiment). The Y-axis 852 represents the intensity (e.g., optical density). Curve 802 represents the intensity ($OD_{calibpass1}$) for a first printhead resulting from application of calibrated gray scale levels ($r_{calib1}$) that were determined by applying the transfer function for pass 1 (e.g., printhead/engine #1). Curve 804 represents the intensity ($OD_{calibpass2}$) for a second printhead resulting from application of calibrated gray scale levels ($r_{calib2}$) that were determined by applying the transfer function for pass 2 (e.g., printhead/engine #2). The resulting measured intensity ($OD_{measured\_mpass}$) is represented by curve 806 which can be seen to closely match the desired target intensity ($OD_{target}$) represented by curve 808. This particular selection of calibrated transfer functions may be employed to reduce total ink usage of the printing system.

FIG. 9 shows a graph 900 similar to that of FIG. 8 except that a single calibrated transform function is used for both passes (i.e., both heads) of the dual-pass printing system. Curve 902 represents the intensity ($OD_{calibpass1}$) for a first printhead resulting from application of calibrated gray scale levels ($r_{calib1}$) that were determined by applying the single transfer function. Curve 904 represents the intensity ($OD_{calibpass2}$) for a second printhead resulting from application of calibrated gray scale levels ($r_{calib2}$) that were determined by applying the same transfer function which was used for pass 1. Graph 900 represents the output intensities of each of the dual printheads by application of the same transfer function to produce the desired target intensity. Such a solution may be employed, for example, where each printhead is intended to output an equal amount of ink.

Since $r_1$ and $r_2$ are independent, multiple sets of transfer functions can be determined, one for each pass, which can be used to achieve a calibrated system. The algorithm therefore introduces $r_{target1}$ and $r_{target2}$ as new independent variables for the gray scale levels for each pass. These new variables represent a finite set of values. Replacing $r_{target}$ with $r_{target1}$, or $r_{target2}$ in the previous equations and using $r_{calib1}$ and $r_{calib2}$ allows a determination of the individual transfer functions. Substituting these individually the transformation from $r_{target1}$ to $r_{calib1}$ allows definition of a transfer function for the first printhead $TF_{pass1}$. Similarly, substituting $r_{target2}$ determines a transformation from $r_{target2}$ to $r_{calib2}$ defining a transfer function for the second printhead $TF_{pass2}$. The individual transfer functions for each pass can be expressed as $r_{calib1} = TF_{pass1}(r_{target1})$ and $r_{calib2} = TF_{pass2}(r_{target2})$. Since the variables for the transfer functions have a finite number of values these transfer functions can be expressed as LUTs (Look Up Tables). The independent transfer functions may be defined as equations by fitting an appropriate curve to the related data (e.g., a spline curve). In one exemplary embodiment, the independent transfer functions are implemented as one or more lookup tables (LUTs) relating a target gray scale level to the calibrated gray scale level to be applied to each of one or more printheads. Each transfer function could be represented in a separate 1-dimensional LUT or all the transfer functions may be represented in a single 2-dimensional LUT data structure as a matter of design choice. Alternately calibrated halftones for each of the printheads can be used to produce the same result as using transfer functions. Each calibrated halftone pattern adjusts the nominal halftone pattern for a corresponding gray scale level for a corresponding printhead to produce the desired target intensity level when all printheads are operated in the multi-pass mode.

The algorithm may also be understood in terms of example applications of the algorithm. The following sample cases illustrate how images printed with one single-pass printer (case 1 below) and two printers with the same transfer function (case 2 below) reduces from the proposed generalized equations above to the correct results and verifies the algorithm described above.

1) Case one, assume there is only one pass.
Setting $r_2, r_3, \ldots = 0$, reduces the solution to one single pass system.

$(r_1, r_2) = H^-(G(r_{target}))$, converges to $(r_1, 0) = H^-(G(r_{target}))$ which can be written as $r_1 = H^-(G(r_{target}))$ Since $r_2 = 0$, then $H = T1$
where T1 is the measured response function for a single printer (e.g. Pass one).

Therefore, $r_1 = T1^-(G(r_{target}))$

Which is a normal transformation non-linear mapping for one printer.

A similar result occurs if $r_1 = 0$

Therefore, $r_2 = T2^-(G(r_{target}))$ where T2 is the measured response function for a single printer (e.g. Pass two).
Which again is a normal TRC non-linear mapping for one printer.

2) Case two, assume both single pass inputs are the same $(r_1, r_2) = H^-(G(r_{target}))$ If, $r_1 = r_2$, converges to $(r_1, r_1) = H^-(G(r_{target}))$, Computing the transfer functions for this case, both transfer functions are the same. Therefore one transfer function can be used for each single pass.

So, $TF_{pass1} = TF_{pass2}$

Restricting the print systems to print the same data for each pass produces $r_1 = H^-(G(r_{target}))$, Computing the transfer function for this case, it is observed that one transfer function is required for each of the passes to produce a calibrated result. This single transfer function relates $r_{target}$ to $r_1$, therefore it is identical to $TF_{pass1}$. The second transfer function $TF_{pass2}$ will be equal to $TF_{pass1}$.

Figure 10:
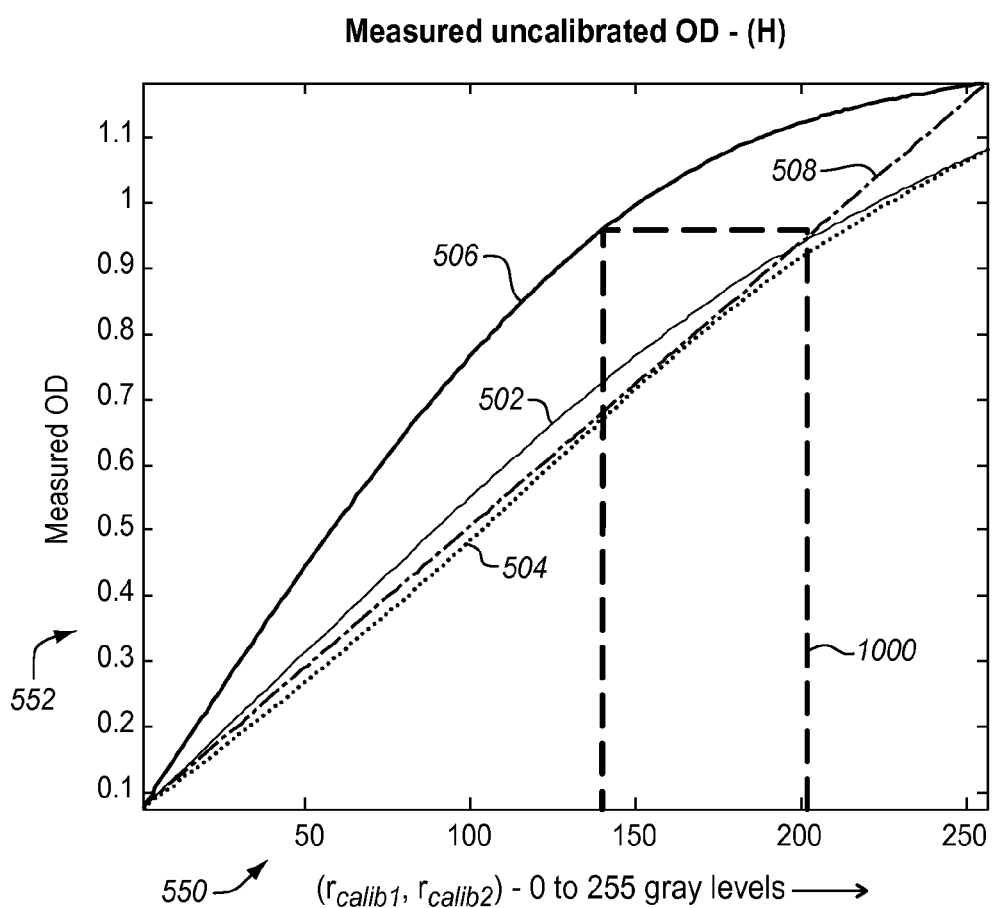
FIG. 10 shows the graph of FIG. 5 annotated to aid in explaining the operation of an algorithm in accordance with an exemplary embodiment of the invention.

The algorithm's derivation and use of the calibrated transfer functions can also be understood visually with reference to FIG. 10. FIG. 10 duplicates the graph of FIG. 5 as discussed above and annotates with dashed line 1000 as discussed below. In this case a single transfer function is determined which applied to printing for each printhead (thus the nearly identical measured output for each printhead as indicated by plots 502 and 504). A gray scale level $r_{target}$ is selected (e.g., 200 on X-axis 550) and the corresponding intensity $OD_{target}$ for this level is determined (e.g., where dashed line 1000 intersects plot 508). The gray scale level that is required to print ($r_{calib}$) for the multi-pass system is visually indicated where dashed line 1000 shifts left in the figure from the $OD_{target}$ value (about 0.95) to intersect the measured system function (e.g., system measured OD plot 506). Dashed line 1000 then shifts downward to the gray scale level X-axis 550 (e.g., $r_{calib}$ is about 140). It is visually evident in FIG. 10 that this is the approximate gray scale level to be applied to each printhead since each printhead generating its printed output for gray scale level 140 (approximately) generates, in combination of the multi-pass mode, the target intensity level ($OD_{target}$ of about 0.95). By repeating this visual process (by its underlying mathematical process) for all possible gray scale level values of $r_{target}$ (e.g., 0-255 as indicated along X-axis 550), the transformation of each possible $r_{target}$ value into its corresponding $r_{calib}$ value may be defined and hence the calibrated transfer function may be defined for each printhead.

This can be extended to a case where the measured system is described by a 3D plot of intensity versus print levels for each pass. For this case a gray level $r_{target}$ is selected and the corresponding target intensity $OD_{target}$ for this level is determined. The levels which are required to print, $r_{calib1}$ and $r_{calib2}$, for the multi-pass system is where $OD_{target}$ intersects the measured system function surface and is reflected into the gray level plane. Multiple pairs of levels (2-tuples) occur for this case. Repeating this for all target and calibrated levels define the required transfer functions required for each pass.

Figure 11:
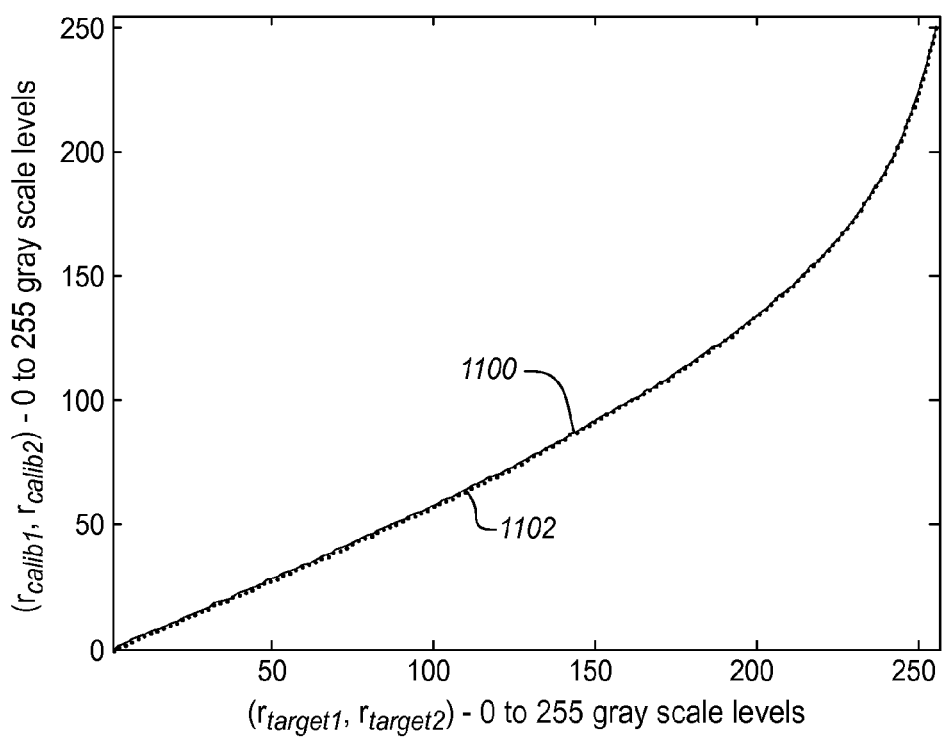
FIGS. 11 and 12 show graphs of two exemplary solutions for mapping input gray scale levels to corresponding target gray scale levels using calibrated transfer functions in accordance with embodiments of the invention.

FIG. 11 is a graph depicting the same calibrated transfer function for each of two printheads for the single transfer function case. Plotted functions 1100 and 1102 each show the same calibrated transfer function mapping a desired gray scale level (i.e., an input gray scale level for a pixel of an image to be printed) into a corresponding target gray scale level to be applied to each of two printheads (i.e., $r_{target1} \Rightarrow r_{calib1}$ and $r_{target2} \Rightarrow r_{calib2}$).

Figure 12:
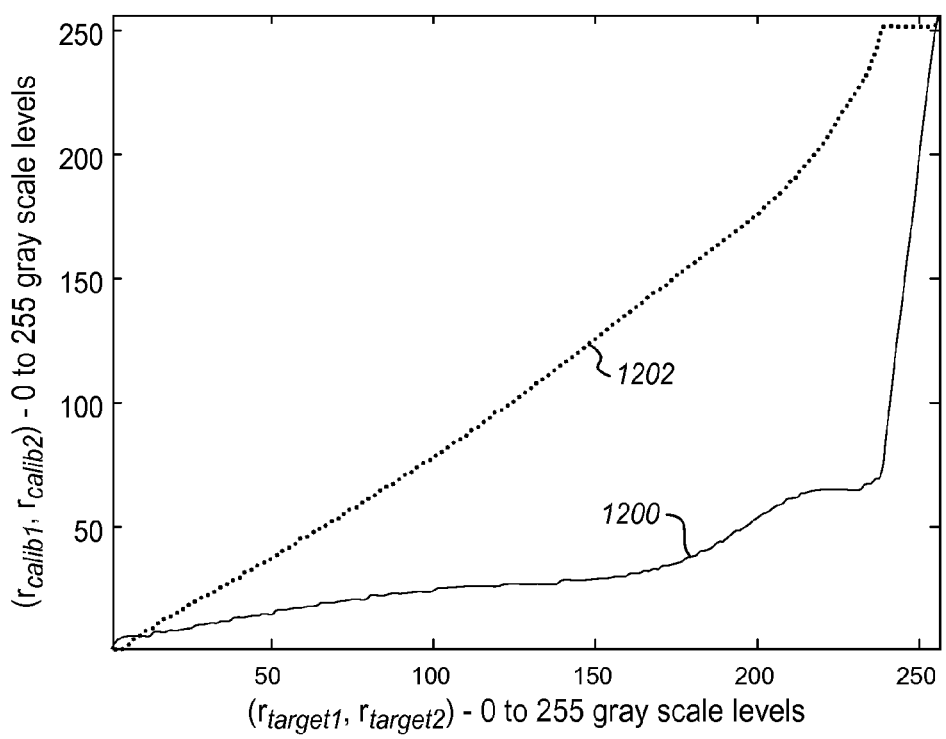

FIG. 12 is a graph depicting another solution where the calibrated transfer functions for each of two printheads are different (i.e., each printhead generating a different output that, in combination, produces the desired output intensity when operated in multi-pass mode). Plotted function 1200 depicts the calibrated transfer function to map an input gray scale level ($r_{target1}$) for the first printhead to a corresponding target ($r_{calib1}$) and function 1202 maps an input gray scale level ($r_{target2}$) for the second printhead to a corresponding target ($r_{calib2}$). Such an exemplary solution may be used to reduce total ink usage of the printing system operating in the multi-pass mode.

Figure 13:
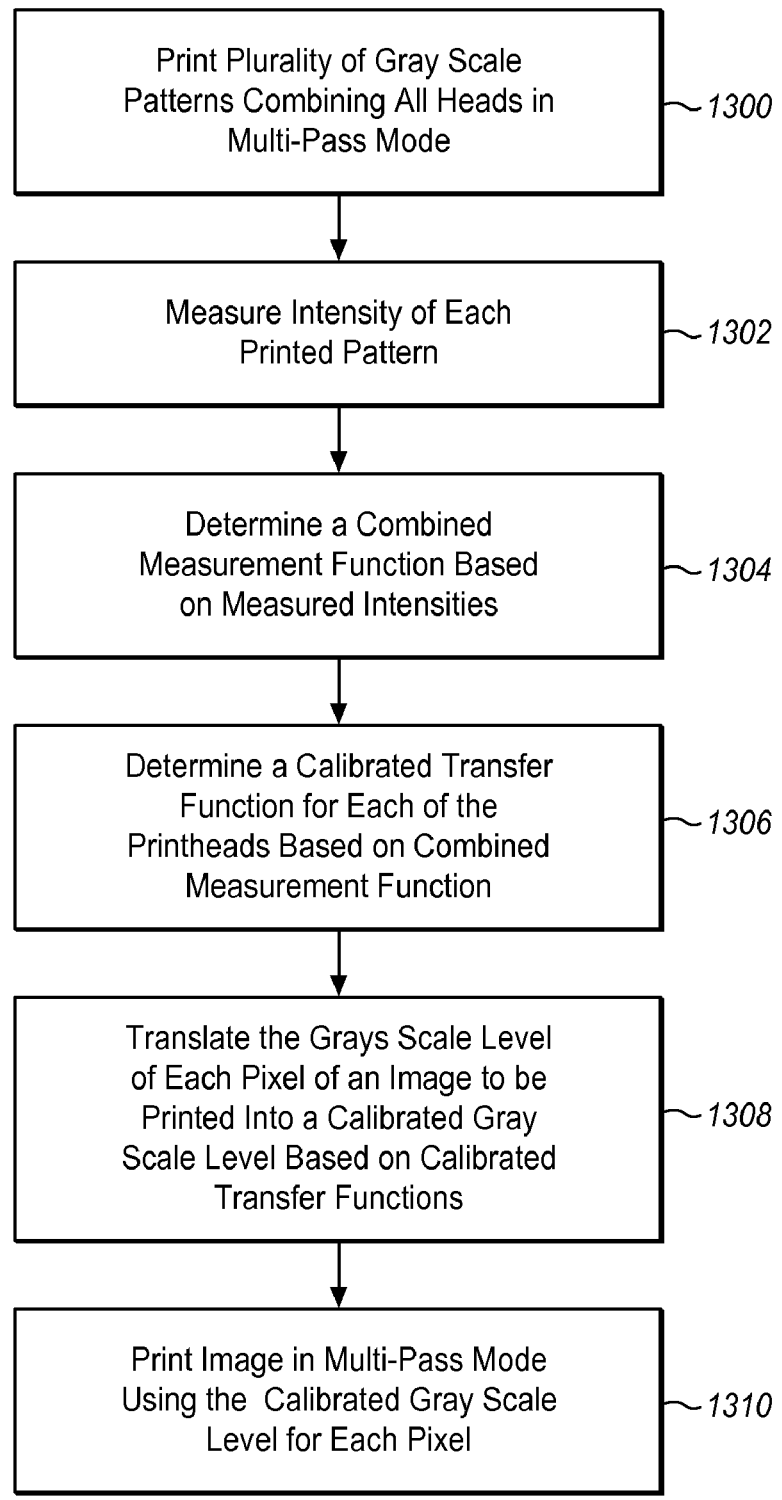
FIGS. 13 and 14 are flowcharts describing exemplary methods in accordance with embodiments of the invention

FIG. 13 is a flowchart describing an exemplary method for calibrating multiple printheads to be used in a multi-pass printing system operating in a multi-pass mode in accordance with features and aspects hereof. The method of FIG. 13 may be operable in a printing system such as systems 100 and 200 of FIGS. 1 and 2. Step 1300 generates and prints a plurality of printed patterns printed in the multi-pass mode of operation of the printing system. Each of a plurality of gray scale level values is applied to each of the multiple printheads. In one exemplary embodiment, all possible combinations of gray scale levels are applied to each of the printheads such that a gray scale printed pattern is printed for each combination of the possible gray scale level values. In other exemplary embodiments, a subset of all possible gray scale combination values are applied to each of the printheads. Still further, each printhead may receive the same gray scale level value for printing each of the printed patterns. In still other exemplary embodiments, the printheads may receive different subsets of gray scale level values. So long as the combination of gray scale level values applied to each printhead is known to correspond with a particular printed pattern, any combination of gray scale level values may be applied to each of the printheads to generate a corresponding printed pattern corresponding to the combination of each of the heads operating in a multi-pass print mode.

Step 1302 measures the intensity of each of the printed patterns. In one exemplary embodiment, step 1302 may be performed by operation of an optical scanner within the printing system. An optical scanner measures the RGB values of the scanned image, which can be converted into optical density of each of the printed patterns. Step 1304 then determines a combined measurement function relating the measured intensity of each printed pattern and the gray scale levels applied to each of the printheads generating each printed pattern. In one exemplary embodiment curve fitting techniques may be used to determine the combined measurement function as a j+1 dimensional surface relating the measured intensities of the printed patterns with the gray scale level values applied to each of the printheads to generate each printed pattern, where j is the number of printheads in the printing system. The function "H" discussed above is an example of a combined measurement function relating the measured intensities to the gray scale levels applied to each of the printheads used to generate the printed pattern, Step 1306 next determines a calibrated transfer function for each of the printheads based on the combined measurement function. The calibrated transfer function relates image gray level values with the calibrated gray scale levels to be applied to a printhead to generate the desired intensity when the printhead is operated in the multi-pass mode of printing. An exemplary desired target intensity is associated with each pixel of an image to be printed. The functions $TF_{pass1}$ and $TF_{pass2}$ discussed above are examples of calibrated transfer functions that may be determined by processing of step 1306.

The calibrated transfer functions determined by step 1306 are then utilized in step 1308 to transform or translate the gray scale level value of each pixel of a provided image into a corresponding calibrated gray scale level value. The translated pixel gray scale level value is then used at step 1310 in printing the provided image using the printing system in the multi-pass mode.

Figure 14:
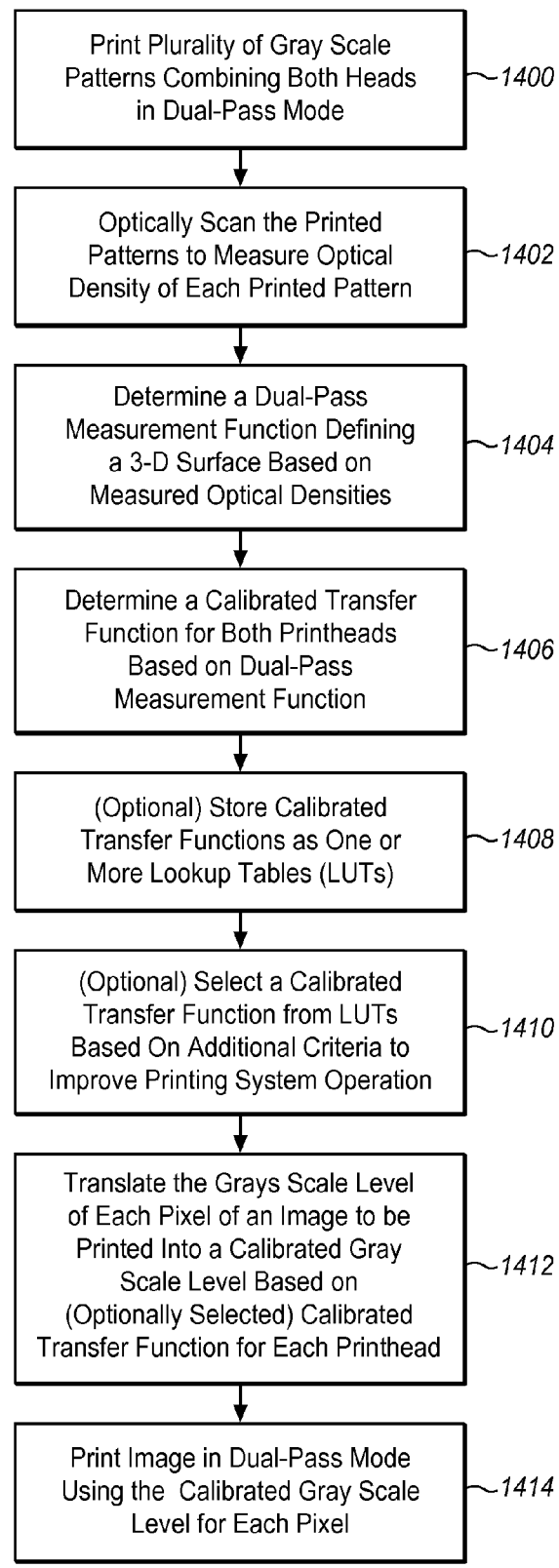

FIG. 14 is a flowchart showing another exemplary embodiment of a calibration method for calibrating operation of multiple printheads in a multi-pass mode printing system. The method of FIG. 14 may be performed within, for example, the printing systems 100 and 200 of FIGS. 1 and 2. In particular, the method of FIG. 14 is similar to that of FIG. 14 but provides some additional detail for an embodiment using two printheads in the multi-pass printing system (i.e., a "dual-pass" printing system. Step 1400 prints a plurality of gray scale printed patterns—each printed pattern generated by a combination of gray scale level values applied to each of two printheads in a multi-pass (i.e., "dual-pass) mode. Step 1402 then optically scans the gray scale printed patterns to measure the intensity of each printed pattern. The intensity may be measured by an optical scanning device integrated with the printing system. In one exemplary embodiment, the intensity may be measured by a densitometer as the "optical density" of the printed patterns. Those of ordinary skill in the art will readily recognize numerous other optical characteristics and corresponding measurement devices to measure intensity of the printed patterns.

Step 1404 then determines a dual-pass measurement function (i.e., function "H" as discussed above) relating the measured optical density of each printed pattern to the corresponding gray scale level values applied to each of the dual printheads to generate the corresponding printed patterns. Since there are two printheads in a dual-pass mode printing system, the dual-pass measurement function defines a 3-dimensional surface. The X and Y axes of the surface represent the gray scale level values applied to each of the two printheads. The Z axis represents the optical density resulting from application of corresponding gray scale level values to each of the dual printheads operating in dual-pass mode to generate the printed patterns.

Step 1406 then determines two calibrated transfer functions—one for each of the dual printheads. The calibrated transfer functions are determined based on the measurement function surface defined above in step 1404. Each calibrated transfer functions maps an input or target gray scale level value into a corresponding calibrated gray scale level value for the corresponding printhead.

The calibrated transfer functions determined in step 1406 may be implemented as polynomial equations within the printing system to be computed as needed for transforming/translating input pixel values of an image to be printed. In one exemplary, optional, embodiment, the calibrated transfer function may be implemented as one or more lookup tables as indicated by step 1408. A lookup table entry relates an input gray scale level value to one or more corresponding calibrated gray scale level values. It will be understood by those of ordinary skill in the art that the surface represented by the function "H" discussed above may define a plurality of pairs of gray scale level values (e.g., 2-tuples comprising one gray scale level value for each printhead) that may generate the desired target intensity level when operating the printing system in multi-pass mode (i.e., dual pass mode). Since multiple 2-tuples may map to a given target intensity level, the lookup table ("LUT") may encode multiple calibrated gray scale level values for each input target gray scale value. This provides a way to alter the output to achieve different objectives such as minimum ink or to vary image quality.

As noted above, one of the multiple possible mappings from input gray scale levels to calibrated gray scale levels may be selected based on additional criteria. A variety of additional criteria may be used to determine which of multiple possible mappings are to be used for translating pixels of an image to be printed. Step 1410 therefore represents selection of one of the one or more possible translations/transformations (i.e., one of the multiple possible solutions) from an input gray scale level value to a calibrated gray scale level value for each printhead.

Steps 1412 and 1414 then apply the (selected) calibrated transfer functions for each of the printheads to translate input gray scale level values of pixels associated with an input image to be printed. The image pixels so translated are then applied to the printheads to print a provided image on a printable substrate.

As noted above, the systems and apparatus of FIGS. 1 and 2 may be replicated to provide desired multi-pass calibration for multiple printheads/engines in each of multiple color planes of a full color printer. Thus, the algorithms and methods exemplified above in FIGS. 4 through 14 may be repeated for each of the multiple color planes.

Figure 15:
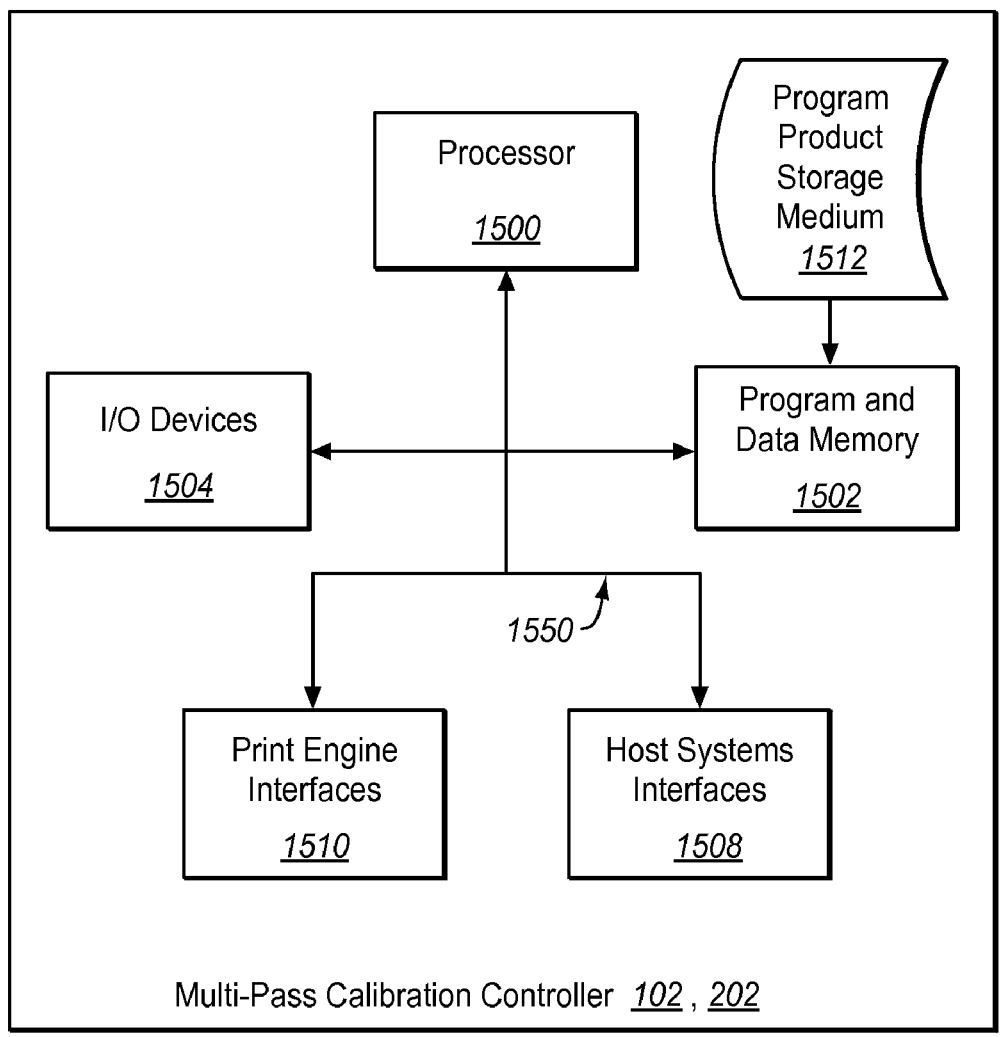
FIG. 15 is a block diagram of an exemplary computing device in which a computer readable medium may provide the methods of exemplary embodiments of the invention.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, etc. FIG. 15 is a block diagram depicting a multi-pass calibration controller (e.g., 102 and 202 of FIGS. 1 and 2) as a data processing device adapted to provide features and aspects hereof by executing programmed instructions and accessing data stored on a computer readable storage medium 1512.

Furthermore, the invention can take the form of a computer program product accessible from a computer-usable or computer-readable medium 1512 providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor 1500 coupled directly or indirectly to memory elements 1502 through a system bus 1550. The memory elements can include local memory employed during actual execution of the program code, bulk storage, and cache memories which provide temporary storage of at least some program code in order to reduce the number of times code must be retrieved from bulk storage during execution.

Input/output or I/O devices 1504 (including but not limited to keyboards, displays, pointing devices, intensity measurement devices, optical scanner devices, densitometers, etc.) can be coupled to the system either directly or through intervening I/O controllers. One particular I/O device useful in a data processing system adapted as a printer controller is a print engine interface 1510 for coupling the multi-pass calibration controller (102, 202) to the signals and protocols of the print engines adapted for marking pixels on paper.

Network adapters or other host system interfaces 1508 may also be coupled to the system to enable the data processing system to become coupled to other data processing systems or storage devices through intervening private or public networks. Modems, cable modems, IBM Channel attachments, SCSI, Fibre Channel, and Ethernet cards are just a few of the currently available types of network or host interface adapters.

Although specific embodiments are described herein, the scope of the invention is not limited to those specific embodiments. The scope of the invention is defined by the following claims and any equivalents thereof.

We claim:

1. A method of calibrating multiple fixed printheads operable in a multi-pass printing system to print a provided image on the printing system, the image comprising a plurality of pixels, each pixel associated with an input gray scale level, the method comprising:

printing a plurality of printed patterns wherein each printed pattern is generated as a combination of each of the multiple fixed printheads (1 . . . j) operating in a multi-pass mode, wherein each of the multiple fixed printheads is using substantially the same ink, and wherein each of the multiple fixed printheads generates a gray scale pattern associated with a corresponding gray scale level for each of the plurality of printed patterns;

measuring an intensity of each of the plurality printed patterns;

determining a combined measurement function for the multiple fixed printheads operating in a multi-pass mode wherein the combined measurement function relates the measured intensities to the corresponding gray scale level of each printed pattern generated by each of the multiple printheads;

determining a calibrated transfer function for each of the multiple fixed printheads based on the combined measurement function wherein each calibrated transfer function relates an input gray scale level of the image to a corresponding gray scale level used by a corresponding fixed printhead operating in multi-pass mode; and translating the input gray scale level of each pixel into a calibrated gray scale level for each of the multiple fixed printheads using the calibrated transfer function for each printhead; and printing the image on the printing system operating in the multi-pass mode using the calibrated gray scale level for each pixel of the image printed by each printhead.

2. The method of claim 1
wherein the step of determining the combined measurement function comprises:
determining a function (H) of dimension j+1 that defines a surface relating each of a plurality of tuples $(r_1, \ldots r_j)$ with a corresponding measured intensity where each tuple comprises a gray scale level for each of the multiple printheads, where H is defined as:

$$IN_{measured\_mpass} = H(r_1, \ldots r_j)$$

where:

$IN_{measured\_mpass}$ is a measured intensity of a printed pattern generated by each of the multiple printheads generating a corresponding gray scale level $r_1 \ldots r_j$, and $r_i$ is a gray scale level value in the range of a minimum gray scale level value through a maximum gray scale level value used by printhead i (i=1 . . . j) in generating a printed pattern having an intensity $IN_{measured\_mpass}$.

3. The method of claim 2 wherein the step of determining a calibrated transfer function for each of the multiple fixed printheads further comprises:

determining a target intensity function relating a target intensity to a target gray scale level,
where the target intensity function (G) is defined as:

$$IN_{target} = G(r_{target})$$

where $IN_{target}$ is a desired target intensity and $r_{target}$ is a target gray scale level that generates the desired target intensity;

equating the measured intensity and the target intensity as:

$$IN_{target} = IN_{measured\_mpass}$$

which equates to:

$$G(r_{target}) = H(r_1, \ldots r_j)$$

which, solving for $(r_1, \ldots r_j)$, equates to:

$$(r_1, \ldots r_j) = H^{-1}(G(r_{target}))$$

wherein $H^{-1}$ is the inverse of the function H, thereby determining a combined transfer function for all of the fixed printheads as the relation between each target gray scale level $r_{target}$ and one or more corresponding tuples $(r_1, \ldots r_j)$; and determining a calibrated transfer function for each of the fixed printheads based on the relationship between each target gray scale level and each of the corresponding one or more tuples.

4. The method of claim 3 wherein the step of determining the calibrated transfer function further comprises:

identifying one or more tuples $(r_1, \ldots r_j)$ for each possible target gray scale level $r_{target}$ for the printing system operating in the multi-pass mode.

5. The method of claim 4 wherein the step of printing further comprises:

selecting a tuple for a provided image based on additional criteria where the additional criteria includes one or more of:

reduced ink usage of one or more of the multiple fixed printheads,
reduced paper wetness for the printed image,
reduced graininess of the printed image, and/or
improved uniformity of the printed image.

6. The method of claim 4 wherein the step of determining the calibrated transfer function for each of the multiple fixed printheads further comprises:

generating a look-up table (LUT) having a plurality of entries each entry translating a target intensity ($r_{target}$) into a corresponding tuple $(r_1, \ldots r_j)$ indicating a calibrated gray scale level for each of the multiple fixed printheads used to generate the target intensity, and wherein the step of selecting a tuple further comprises:
selecting an entry in the LUT where the selected entry translates a desired target gray scale level ($r_{target}$) into a gray scale level for each of the multiple fixed printheads $(r_1, \ldots r_j)$.

7. The method of claim 1 where the intensity is measured as an optical density, and wherein the step of measuring further comprises:

scanning the printed patterns using an optical scanner in the printing system to measure the optical density of each of the printed patterns.

8. A computer readable medium embodying programmed instructions which, when executed on a computing device of a printing system, perform a method of calibrating multiple fixed printheads operable in a multi-pass printing system to print a provided image on the printing system, the image comprising a plurality of pixels, each pixel associated with an input gray scale level, the method comprising:

printing a plurality of printed patterns wherein each printed pattern is generated as a combination of each of the multiple fixed printheads (1 . . . j) operating in a multi-pass mode, wherein each of the multiple fixed printheads is using substantially the same ink, and wherein each of the multiple fixed printheads generates a gray scale pattern associated with a corresponding gray scale level for each of the plurality of printed patterns;

measuring an intensity of each of the plurality printed patterns;

determining a combined measurement function for the multiple fixed printheads operating in a multi-pass mode wherein the combined measurement function relates the measured intensities to the corresponding gray scale level of each printed pattern generated by each of the multiple printheads;

determining a calibrated transfer function for each of the multiple fixed printheads based on the combined measurement function wherein each calibrated transfer function relates an input gray scale level of the image to a corresponding gray scale level used by a corresponding fixed printhead operating in multi-pass mode; and translating the input gray scale level of each pixel into a calibrated gray scale level for each of the multiple fixed printheads using the calibrated transfer function for each printhead; and printing the image on the printing system operating in the multi-pass mode using the calibrated gray scale level for each pixel of the image printed by each printhead.

9. The computer readable medium of claim 8 wherein the method step of determining the combined measurement function comprises:

determining a function (H) of dimension j+1 that defines a surface relating each of a plurality of tuples $(r_1, \ldots r_j)$ with a corresponding measured intensity where each tuple comprises a gray scale level for each of the multiple printheads, where H is defined as:

$$IN_{measured\_mpass} = H(r_1, \ldots r_j)$$

where:

$IN_{measured\_mpass}$ is a measured intensity of a printed pattern generated by each of the multiple printheads generating a corresponding gray scale level $r_1 \ldots r_j$, and $r_i$ is a gray scale level value in the range of a minimum gray scale level value through a maximum gray scale level value used by printhead i (i=1 ... j) in generating a printed pattern having an intensity $IN_{measured\_mpass}$.

10. The computer readable medium of claim 9 wherein the method step of determining a calibrated transfer function for each of the multiple fixed printheads further comprises:
determining a target intensity function relating a target intensity to a target gray scale level,
where the target intensity function (G) is defined as:

$$IN_{target} = G(r_{target})$$

where $IN_{target}$ is a desired target intensity and $r_{target}$ is a target gray scale level that generates the desired target intensity;
equating the measured intensity and the target intensity as:

$$IN_{target} = IN_{measured\_mpass}$$

which equates to:

$$G(r_{target}) = H(r_1, \ldots r_j)$$

which, solving for $(r_1, \ldots r_j)$, equates to:

$$(r_1, \ldots r_j) = H^{-1}(G(r_{target}))$$

wherein $H^{-1}$ is the inverse of the function H, thereby determining a combined transfer function for all of the fixed printheads as the relation between each target gray scale level $r_{target}$ and one or more corresponding tuples $(r_1 \ldots r_j)$; and
determining a calibrated transfer function for each of the fixed printheads based on the relationship between each target gray scale level and one or more values of each of the corresponding one or more tuples.

11. The computer readable medium of claim 10 wherein the method step of determining the calibrated transfer function further comprises:
identifying one or more values from a selected one of the one or more tuples $(r_1, \ldots r_j)$ for each possible target gray scale level $r_{target}$ for the printing system operating in the multi-pass mode.

12. The computer readable medium of claim 11 wherein the method step of printing further comprises:
selecting a tuple for a provided image based on additional criteria where the additional criteria includes one or more of:
reduced ink usage of one or more of the multiple fixed printheads,
reduced paper wetness for the printed image,
reduced graininess of the printed image, and/or
improved uniformity of the printed image.

13. The computer readable medium of claim 11 wherein the method step of determining the calibrated transfer function for each of the multiple fixed printheads further comprises:
generating a look-up table (LUT) having a plurality of entries each entry translating a target intensity ($r_{target}$) into a corresponding tuple $(r_1, \ldots r_j)$ indicating a calibrated gray scale level for each of the multiple fixed printheads used to generate the target intensity, and
wherein the method step of selecting a tuple further comprises:
selecting an entry in the LUT where the selected entry translates a desired target intensity ($r_{target}$) into a gray scale level for each of the multiple fixed printheads $(r_1, \ldots r_j)$.

14. The computer readable medium of claim 8 where the intensity is measured as an optical density, and wherein the method step of measuring further comprises:
scanning the printed patterns using an optical scanner in the printing system to measure the optical density of each of the printed patterns.

15. A printing system adapted for multi-pass mode of operation using multiple printheads, the system comprising:
multiple fixed printheads configured to sequentially apply ink to a printable substrate passing by the printheads;
an intensity measurement device configured to measure an intensity of printed patterns generated by the multiple fixed printheads; and
a multi-pass calibration controller coupled with the multiple fixed printheads and coupled with the intensity measurement device,
the multi-pass calibration controller adapted to print a plurality of printed patterns wherein each printed pattern is generated as a combination of each of the multiple fixed printheads (1 ... j) operating in a multi-pass mode, wherein each of the multiple fixed printheads is using substantially the same ink, and wherein each of the multiple fixed printheads generates a gray scale pattern associated with a corresponding gray scale level for each of the plurality of printed patterns, the calibration controller further adapted to measure the intensity of each of the plurality printed patterns, the calibration controller further adapted to determine a combined measurement function for the multiple fixed printheads operating in a multi-pass mode wherein the combined measurement function relates the measured intensities to the corresponding gray scale level of each printed pattern generated by each of the multiple printheads, the calibration controller further adapted to determine a calibrated transfer function for each of the multiple fixed printheads based on the combined measurement function wherein each calibrated transfer function relates an input gray scale level of the image to a corresponding gray scale level used by a corresponding fixed printhead operating in multi-pass mode,
the printing system adapted to translate an input gray scale level of each pixel of a provided image into a calibrated gray scale level for each of the multiple fixed printheads using the calibrated transfer function for each printhead, and
the printing system adapted to print the provided image on the printing system operating in the multi-pass mode using the calibrated gray scale level for each pixel of the image printed by each printhead.

16. The system of claim 15 wherein the printing system comprises multiple print engines, and
wherein each fixed printhead is operable within a separate printer engine of the printing system.

17. The system of claim 15 wherein the intensity measurement device is an optical scanner adapted to measure intensity of the printed patterns as optical density.

18. The system of claim 15 wherein the intensity measurement device is a densitometer.

19. The system of claim 15 wherein the intensity measurement device is a spectrophotometer.

20. The system of claim 15 wherein the printing system comprises multiple fixed printheads for each of multiple color planes, and
wherein the multi-pass calibration controller is adapted to print a plurality of printed patterns for each of the multiple color planes wherein each printed pattern is generated as a combination of each of the multiple fixed printheads (1 . . . j) operating in a multi-pass mode and wherein each of the multiple fixed printheads generates a gray scale pattern associated with a corresponding gray scale level for each of the plurality of printed patterns, the calibration controller further adapted to measure the intensity of each of the plurality printed patterns for each of the multiple color planes, the calibration controller further adapted to determine a combined measurement function for the multiple fixed printheads operating in a multi-pass mode for each of the multiple color planes wherein the combined measurement function relates the measured intensities to the corresponding gray scale level of each printed pattern generated by each of the multiple printheads for each of the multiple color planes, the calibration controller further adapted to determine a calibrated transfer function for each of the multiple fixed printheads for each of the multiple color planes based on the combined measurement function of each of the multiple color planes wherein each calibrated transfer function relates an input gray scale level of the image to a corresponding gray scale level used by a corresponding fixed printhead operating in multi-pass mode.

* * * * *